May 11, 1965 P. GANCEL 3,182,753
SWINGABLE CALIPER, SPOT TYPE DISC BRAKE
Filed Dec. 27, 1961 2 Sheets-Sheet 1

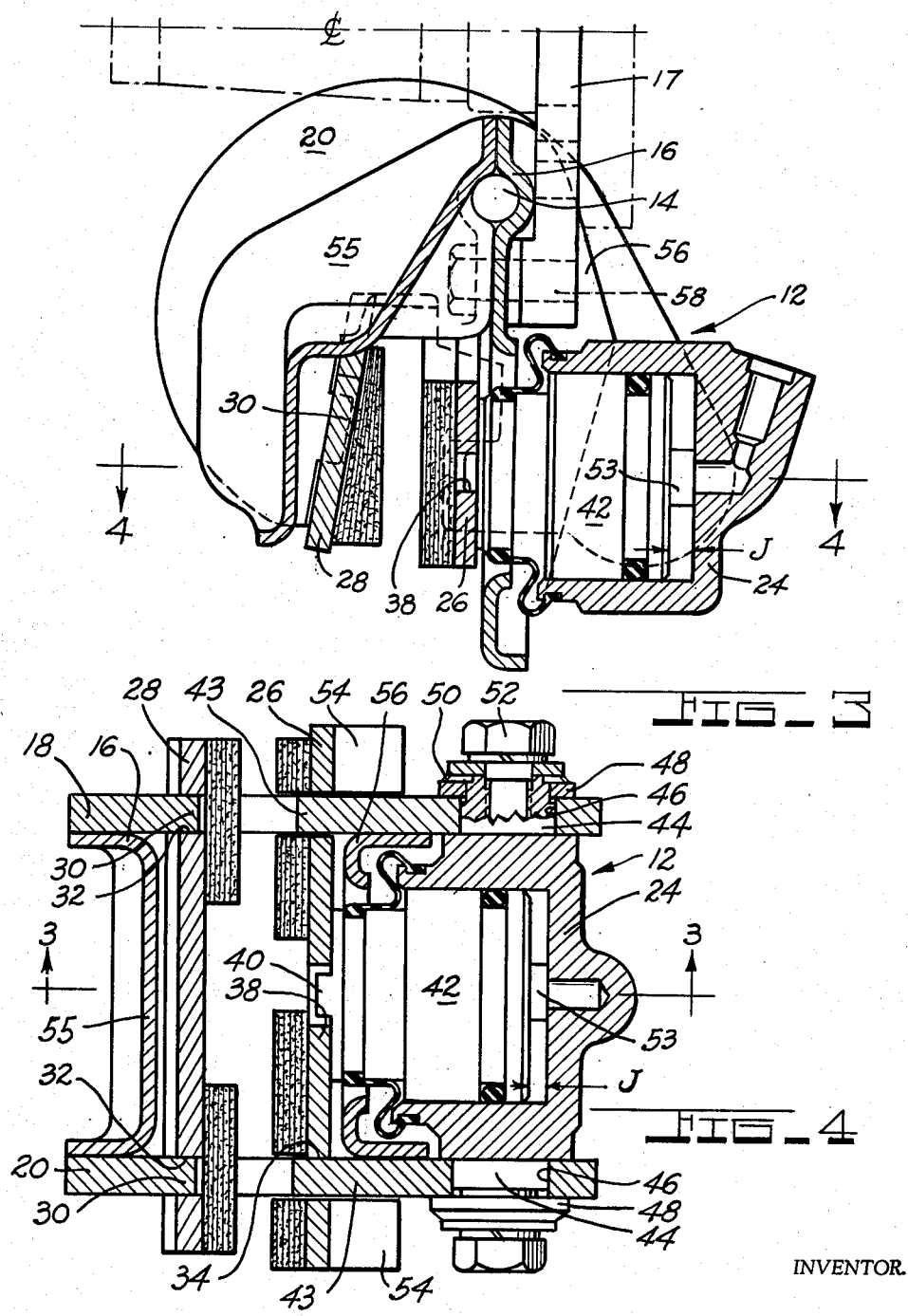

United States Patent Office 3,182,753
Patented May 11, 1965

3,182,753
SWINGABLE CALIPER, SPOT TYPE DISC BRAKE
Pierre Gancel, Paris, France, assignor to Societe Anonyme
D.B.A., Paris, France, a company of France
Filed Dec. 27, 1961, Ser. No. 162,376
Claims priority, application France, Jan. 6, 1961,
848,974
8 Claims. (Cl. 188—73)

The present application is a continuation-in-part of my earlier filed copending U.S. patent application Serial No. 150,505 filed on November 6, 1961 and relates to swinging housing disc brakes of the type comprising a housing straddling an angular portion of a rotatable disc to be braked and provided with an actuating means which causes the housing to swing about a fixed axis thereby to cause the application of a pad connected to the housing against one face of the disc and the displacement of a second pad with respect to the housing to apply it against the opposite face of the disc.

The parent patent application was characterized by the use of a composite housing formed by two laterally spaced calipers pivotable about a fixed axis and braced by the friction pads themselves, so as to form a box structure which reduces deformations of the housing under the action of the forces which appear during braking.

An object of the present invention is to render the brake described in the above-mentioned application capable of producing higher braking torque. This is effected by causing the pad forces to be transmitted directly from the calipers to a fixed support mounted between them, without the transmission of this effort imposing an appreciable flexion strain on the calipers.

For this purpose, the fixed support is disposed substantially perpendicular to the calipers, the latter being adapted to slide on the support during their swinging movement. The support may be directly bolted to the wheel spindle and formed as a two-piece assembly arranged to support the shaft about which the housing swings.

The invention will be better understood from a consideration of the following description which refers to the accompanying drawings, in which:

FIG. 3 is a view in cross section taken along line 3—3 of FIG. 4; and

FIG. 4 is a view in cross section taken along line 4—4 of either FIG. 1 or FIG. 3.

Figure 1:
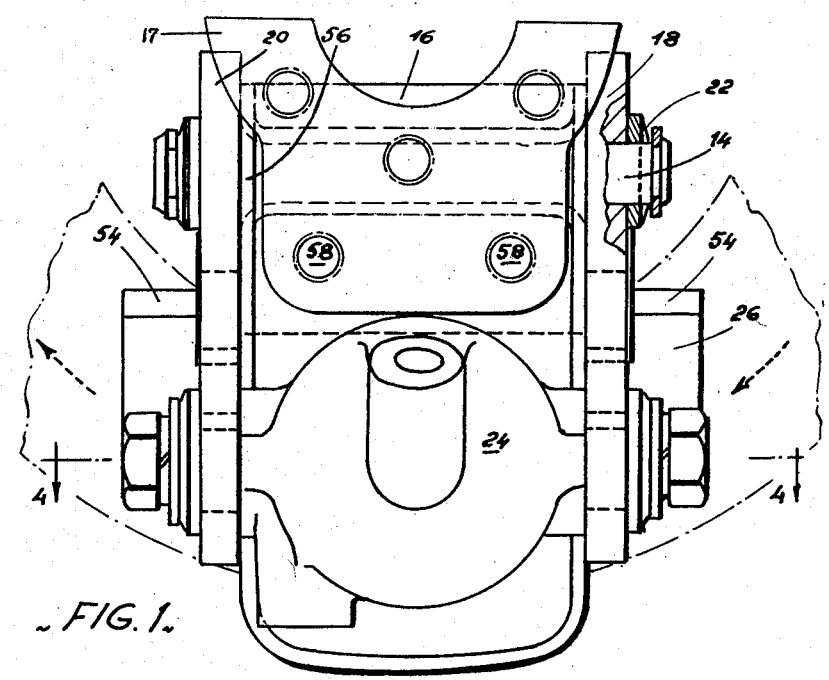
FIG. 1 shows in elevation a disc brake in accordance with the present invention.

The brake shown comprises a swinging housing 12 and a rotating disc to be braked (shown in phantom in FIG. 1). The disc is restrained against movement in the axial direction and is driven in rotation at its external periphery. The housing 12 swings on a shaft 14 carried by a support 16 fixed to an axle flange 17. The housing comprises two C-shaped calipers 18 and 20 which straddle the internal periphery of the disc. The bottom of the two calipers is pivotally mounted on the shaft 14, and elastic washers 22, each compressed between a friction washer abutting on a caliper and a lock ring carried by the shaft 14, assure a mounting of the housing which is without play (FIG. 1).

Figure 2:
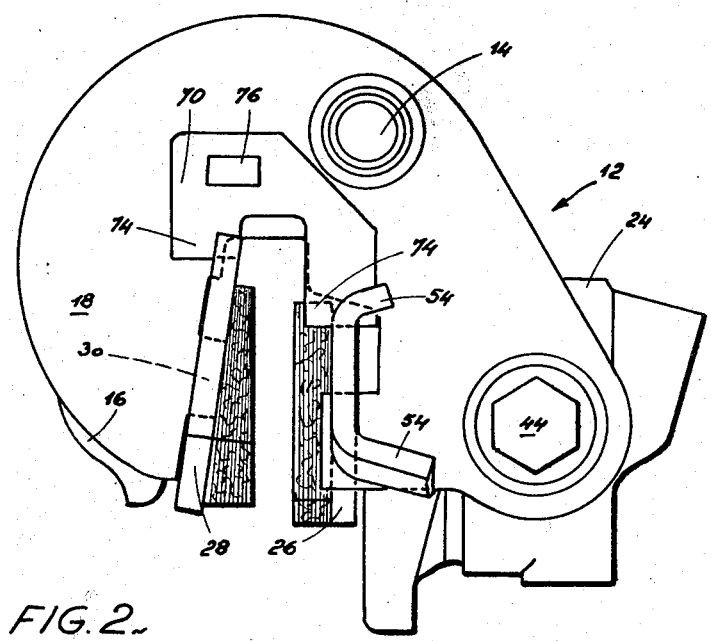
FIG. 2 is a view of the left side of the brake shown in FIG. 1.

The two calipers are braced by a cylinder block 24 and two friction pads 26 and 28. The pad 28, fixed with respect to the calipers, forms part of the housing. It is rigidly connected to the calipers by the engagement of a tenon 30, provided on each caliper, in slots 32 arranged in the sheet metal support of the pad 28 (FIGS. 2–4). When, as in the embodiment shown, the calipers bear on the pad 28 and are rigidly connected to it, the friction lining should be tapered so that complete wearing occurs at the same moment for the entire lining.

The pad 26, moveable with respect to the housing 12, also contributes to the rigidity of the housing and is attached to the housing by an attachment device similar to that of the pad 28 except it permits sliding. A tenon 43 formed on each caliper is engaged in a corresponding slot 34 provided in the pad 26. The sheet metal support of the pad 26 is also pierced by a central hole 38 (FIGS. 3–4), in which hole is engaged a terminal centering tenon 40 of the piston 42.

The coupling of the cylinder 24 and the calipers is effected by a device permitting a slight angular displacement of the calipers one with respect to the other. The cylinder is provided with two lateral shafts 44 which are arranged in bearing holes 46 provided in the calipers 18 and 20. Elastic elements, such as Belleville washers 50, retained in compression by nuts 52 (FIG. 4), press the calipers against the cylinder. The latter may nevertheless take an oblique position with respect to the calipers by distorting the washers to compensate for the angular shift of the calipers. The mounting of the latter on the shaft by means of elastic washers also facilitates this deformation. Between the Belleville washers 50 and the calipers, friction washers 48 are also disposed to restrain rotation of the cylinder.

The use of a resilient device instead of a rigid connection has the advantage of leaving the cylinder free to orient itself so as to compensate for a temporary warping of the disc. In proportion to the wearing of the linings, the orientation of the cylinder block with respect to the calipers changes under the action of the off-center force which occurs when the piston tends to apply the pad 26 obliquely with respect to the disc, assuming the off-center force is sufficient to overcome the friction of the washers 48.

A device 53 of the type which automatically compensates for lining wear and elastically absorbs the deflections of the disc, is interposed between the piston 42 and the cylinder block 24. Such a device is described in French Patent No. 1,266,506 filed May 24, 1960 in the name of "The Bendix Corporation." In FIGURES 3 and 4, it is seen that when the linings are new, a clearance "j" exists between the bottom of the cylinder and the piston which permits backward movement of the piston. This factor also plays a part in permitting easy replacement of the friction pads.

The edges of the support plate of the movable pad, or at least the lateral edges 54 (FIG. 2), are turned back rearwardly to lessen the risk of escape of the pads when the linings approach a state of wear requiring their replacement, an elastic blade 70 placed between the lateral edges of the pads and one of the calipers (FIG. 2) suppresses vibrations which are a source of noise. The elastic blade 70, which is slid between the caliper 18 and the pads, possesses two projecting edges 74, each of which is squeezed between a pad and the caliper 18 to elastically maintain the pads and prevent their oscillation. The fixing of the blade 70 is achieved by the projection of a button 76 on the caliper 18 into a hole of a corresponding shape in the blade.

The brake, as it has been described to this point, is similar to those described in the cited main patent application. A point of departure lies in the provision and the construction of the fixed support 16. This support, comprising two members 55 and 56 assembled by bolts or rivets 58, is attached to the fixed element of the wheel such as an axle flange 17 (the spindle in the case of front-mounted brakes) by bolts 58. The two members 55 and 56 confine between themselves, the shaft 14 (FIGS. 1 and 3) about which the calipers 18 and 20 swing. The lateral parts of the members 55 and 56 are turned back parallel to the calipers to increase the abutting surface and to made the support more rigid, the support being also provided with ribs (FIGS. 1 and 3).

During braking, the calipers are submitted to the braking force exerted by the disc on the friction pads, but, in contrast to that which occurs in the brakes described in the reference main patent application they do not transmit this force to the shaft 14. In fact, the force exerted on one of the calipers (caliper 18 if the disc rotates in the direction of the arrow in FIG. 1), bends it toward the support 16 and presses it onto the support which thus absorbs the braking effort. The caliper 18 assumes almost the total braking effort, the deformation of the other caliper being too small to cause a high flexion strain.

Owing to this arrangement, the pads are in effect anchored only at their leading end, that is the end which is first encountered by the rotating disc. This result, rarely obtained in the brakes utilized to date, has the advantage of rendering uniform wear of the lining.

The operation of the brake is similar to that described in the referenced main patent application. When pressure is applied to the cylinder, the force exerted on the piston 42 directly applies the pad 26 against one of the disc faces. The reaction force applied to the cylinder 24 is transmitted to the calipers 18 and 20 causing swinging of the housing 12 and applying the pad 28 against the other face of the disc.

The braking force communicated by the rotating disc to the pads 26 and 28 during braking is transmitted to the calipers 18 and 20 by the slots 32 and 34 acting on the tenons 30 and 45 of the calipers. But, contrary to the type of brake in which the calipers transmit the braking effort to the shaft 14, the calipers are not subject to flexion of any magnitude. The caliper hooked to the "leading" end of the pad deforms just enough to abut on the support 16 and the transmission of the braking effort is effected by direct contact.

When the friction linings are so worn that replacement of the pads becomes necessary it is only necessary to push back the piston 42 while swinging the housing 12 all the way to the left (in FIG. 3) in order to release the fixed pad 28. By swinging the housing the other way, after removal of the pad 28, the pad 26 may be released from the tenons 43 and 40 and then slid laterally out of the housing.

The mounting of new pads is achieved in reverse fashion. Once the pad 26 is in place, the pad 28 is slid in until the tenons 30 engage the slots 32 while at the same time the housing is maintained pressed toward the left to hold the piston 42 flat against the bottom of the cylinder in opposition to the action of the spring used for elastically absorbing disc deflections. In order for such mounting to be possible, it is obvious that the length of the tenons 30 should not be greater than the clearance "j." Once the pad edges are in place, the release of the housing automatically locks the pads *t*, the calipers as a result of the spring return of the wear adjustment device.

It is to be understood that the above-described arrangements are merely illustrative of the application of the principles of the invention. Numerous other arrangements may be devised by those skilled in the art which will embody the principles of the invention and fall within the spirit and scope thereof.

What I claim is:

1. A disc brake comprising: a rotor having opposed friction surfaces thereon, a swingable housing comprising a pair of circumferentially spaced caliper members straddling said rotor, actuating means secured to said caliper members opposite one of said rotor friction surfaces, a first friction member slidable relative to said caliper members for engagement with said one friction surface, a second friction member located opposite the other of said friction surfaces and operatively connected to said housing for movement therewith into engagement with said other friction surface, a fixed support member extending between said caliper members, said support member having anchoring and guiding surfaces at circumferentially spaced ends thereof, each of said caliper members being opposite a respective one of said support member anchoring and guiding surfaces and having a surface slidably engaging its respective support member anchoring and guiding surface, means separate from said anchoring and guiding surfaces swingably connecting said caliper members to said fixed support member for swinging movement of said housing about an axis generally parallel to the plane of said friction surfaces, said swingable connection being constructed and arranged relative to said anchoring surfaces that one caliper will anchor on one of said circumferentially spaced anchoring surfaces of said support member during one direction of rotor rotation and the other caliper member will anchor on the other of said circumferentially spaced anchoring surfaces of said support member during rotor rotation in the opposite direction.

2. A disc brake comprising: a rotor having opposed friction surfaces thereon, a swingable housing comprising a pair of circumferentially spaced caliper member straddling said rotor, actuating means secured to said caliper members opposite one of said rotor friction surfaces, a first friction member slidable relative to said caliper members for engagement with said one friction surface, a second friction member located opposite the other of said friction surfaces and operatively connected to said housing for movement therewith into engagement with said other friction surface, a fixed support member extending between said caliper members, said support member having anchoring and guiding surfaces at circumferentially spaced ends thereof, each of said caliper members being opposite a respective one of said support member anchoring and guiding surfaces and having a surface slidably engaging its respective support member anchoring and guiding surface, a shaft secured to said fixed support member and extending in a direction generally parallel to the plane of said friction surfaces, and means separate from said anchoring and guiding surfaces swingably connecting said caliper members to said shaft for swinging movement of said housing thereabout, said swingable connection being constructed and arranged relative to said anchoring surfaces that one caliper will anchor on one of said circumferentially spaced anchoring surfaces of said support member during one direction of rotor rotation and the other caliper member will anchor on the other of said circumferentially spaced anchoring surfaces of said support member during rotor rotation in the opposite direction.

3. The structure as recited in claim 1 wherein said support member straddles said rotor and said coacting anchoring surfaces are on each side of said rotor.

4. The structure as recited in claim 2 wherein said support member straddles said rotor and said coacting anchoring surfaces are on each side of said rotor.

5. A disc brake in accordance with claim 2, in which said fixed support is formed of two assembled parts supporting said shaft.

6. A disc brake in accordance with claim 5, in which said fixed support has end portions bent back to lie flat against said calipers providing said support member anchoring surfaces.

7. A disc brake in accordance with claim 2, in which said actuating means includes a cylinder block mounted on and extending between said caliper members to act as a spacing brace therefor.

8. A disc brake in accordance with claim 2, in which said friction pads are mounted on said calipers by means of projections on one received by slots in the other.

References Cited by the Examiner

UNITED STATES PATENTS

| 2,009,723 | 7/35 | Begg | 188—78.7 |
| 2,820,530 | 1/58 | Chouings et al. | 188—73 |
| 2,921,651 | 1/60 | Myers | 188—152.873 |
| 2,953,221 | 9/60 | Lucien | 188—73 |

FOREIGN PATENTS

| 1,180,633 | 1/59 | France. |
| 1,060,672 | 7/59 | Germany. |

ARTHUR L. LA POINT, *Primary Examiner.*

T. GRAHAM CRAVER, *Examiner.*